J. T. ALLMAND.
CORD ATTACHMENT.
APPLICATION FILED APR. 25, 1917.

1,263,725. Patented Apr. 23, 1918.

Inventor
JOHN T. ALLMAND.
By Ralzemond A. Parker
Attorney

UNITED STATES PATENT OFFICE.

JOHN T. ALLMAND, OF DETROIT, MICHIGAN, ASSIGNOR TO FISHER BODY CORPORATION, OF DETROIT, MICHIGAN, A CORPORATION OF NEW YORK.

CORD ATTACHMENT.

1,263,725.  Specification of Letters Patent.  Patented Apr. 23, 1918.

Application filed April 25, 1917. Serial No. 164,361.

*To all whom it may concern:*

Be it known that I, JOHN T. ALLMAND, a citizen of the United States, residing at Detroit, county of Wayne, State of Michigan, have invented a certain new and useful Improvement in Cord Attachments, and declare the following to be a full, clear, and exact description of the same, such as will enable others skilled in the art to which it pertains to make and use the same, reference being had to the accompanying drawings, which form a part of this specification.

This invention relates to cord attachments for automobiles, especially to a cord attachment which may be used on the back of the front seat as a substitute for a robe rail and which allows the detaching of one end of the cord to put the robe in place or take it out of place, a very much more convenient operation than endeavoring to stuff a heavy robe in between a rigid rail and the seat.

However, I do not wish to limit myself to a cord used for this purpose as the same cord or similar cord employing some of the devices here shown and claimed can be used as a "pull to" cord for a door in a closed automobile body.

In the drawings,—

Figure 1:
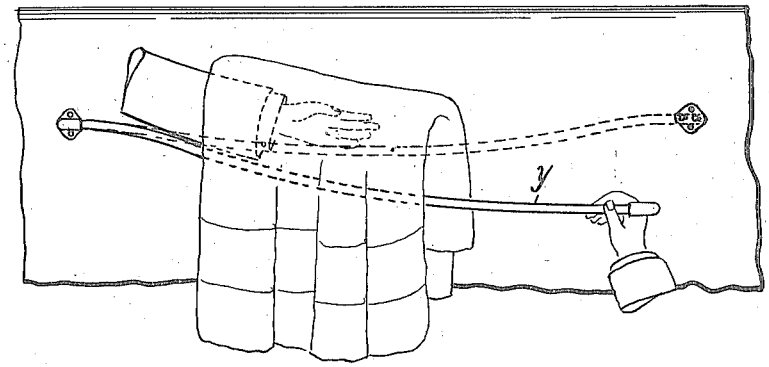
Figure 1 is a view of the rear of the seat, showing the cord attachment used as a robe carrier.
Figure 2:
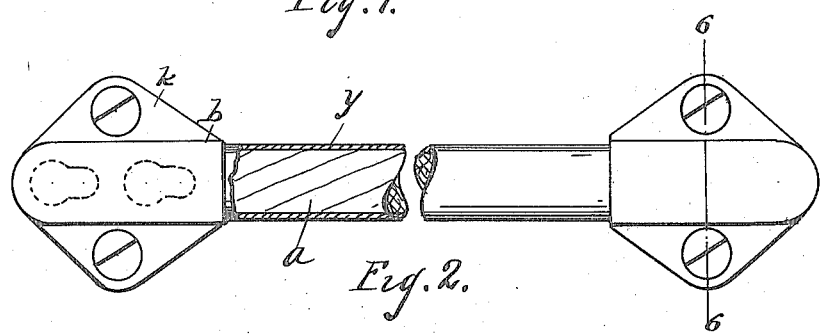
Fig. 2 is an enlarged elevation partly in section of the same.
Figures 3, 6, 7:
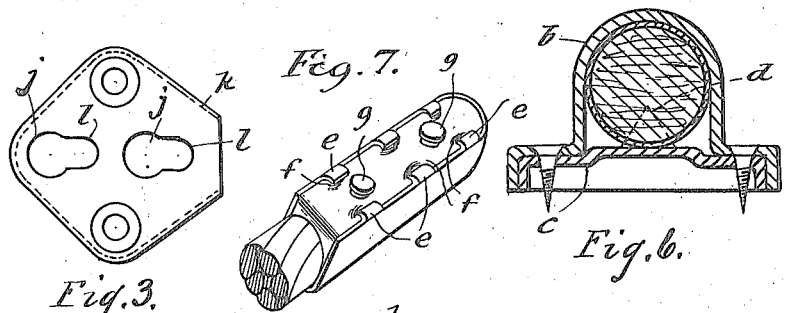
Fig. 3 is an enlarged detail of the base for the detachable cord end.
Fig. 6 is a longitudinal section through the fixed ferrule on the line 6—6 of Fig. 2.
Fig. 7 is a perspective of the detachable cord end, viewed from the rear or under side.
Figures 4, 5:
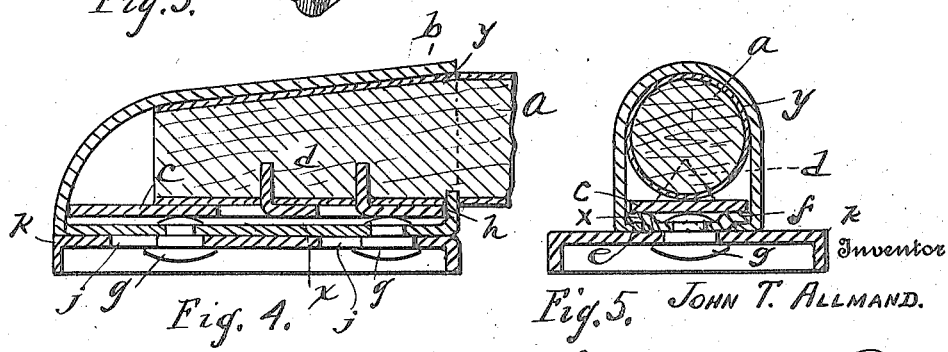
Fig. 4 is a longitudinal section through the detachable end.
Fig. 5 is a cross section through the detachable end.

The cord, designated $a$, is impaled within ferrules at both ends. Each ferrule comprises a cap portion $b$ and an impaling plate $c$. The impaling plate $c$ has points turned up out of the stock to provide impaling members $d$. On the fixed end ferrule (Fig. 6) the impaling plate $c$ is fastened into fixed relation with respect to the cap portion by having flanges that underlie the flange of the cap portion and the two flanges are screwed to the support. This appears in Fig. 6.

At the detachable end the cap portion is provided with turned-under lugs $e$, while the cover plate $x$ is provided with depressions or stamped in portions. The inner end of the cover plate $x$ is provided with a turned-up portion $h$. The lugs $e$ of the cap can be turned over into the depression $f$ and this prevents the cover plate sliding relatively to the cap or dropping out of the cap. However, the cover plate is free to move inwardly for a purpose hereafter to be described. The cord being of normally larger section than the ferrule cap and forced thereinto by pressure, it stays in, and also holds the cover plate $x$ in place by its expansive tendency.

The cover plate $x$ has a pair of buttons $g$ riveted to it. The heads of these can pass through the enlarged openings $j$ in the base $k$ and then slide to the narrow portions $l$ of these slots, which by reason of being of less diameter than the heads, are arranged to retain the heads from being dropped out of the slots. The buttons are prevented from being slid from the narrow to the large end of the opening under ordinary stresses by the friction induced by the pressure afforded through the cover plate and impaling plate from the distorted cord end. In other words, the two free plates in the end of the ferrule in combination with the cord end form a substitute for a spring, and is a much more economical and a neater article to manufacture than possible if some arrangement had to be made to provide spring pressure.

The cord $a$ may be covered by any trimming material $y$ which may be available for the upholstering and hence no difficulty is experienced in matching up the cord with the special material that may be selected by the purchaser of the car for the upholstery.

What I claim is:

1. A cord attachment, having in combination, a cord, a ferrule having one or more buttons which are movably arranged with respect to the ferrule and are yieldingly projected outward by the distortable cord end, and a base in which the buttons are held in engaged position by the friction induced by the outward projection of said buttons, as described.

2. In a cord attachment, the combination of a cord, a ferrule at one end comprising a cap portion and having one or more buttons outwardly projected by the distortable character of the cord, and a base, comprising a slot or slots of a width at one end to take the head of the button and a width at the other end to engage around only the neck of the button.

3. A cord attachment, having in combination, a cord, a ferrule at one end comprising an impaling member with struck-up portions to engage the cord end, a cap portion, a plate having buttons secured thereto, the said impaling member and plate being movable relative to the cap portion, and a base in which said buttons engage and held in locked position by reason of the friction induced by the distorted cord end.

4. In a cord attachment, the combination of a cord, a ferrule at one end comprising a cap portion, an impaling plate, a cover plate provided with depressions, the said cap portion being provided with turned-over lugs that engage in the depressions of the cover plate, and one or more buttons attached to the cover plate, and a base comprising one or more slots of a width at one end to take the head of the button and a width at the other end to engage around only the neck of the button.

In testimony whereof I sign this specification.

JOHN T. ALLMAND.